United States Patent

Vanmaele et al.

Patent Number: 5,476,935
Date of Patent: Dec. 19, 1995

[54] DYES FOR USE IN THERMAL DYE TRANSFER

[75] Inventors: Luc Vanmaele, Lochristi, Belgium; Hans Junek; Renate Dworczak, both of Graz, Austria

[73] Assignee: Agfa-Gevert, N.V., Mortsel, Belgium

[21] Appl. No.: 245,001

[22] Filed: May 18, 1994

Related U.S. Application Data

[62] Division of Ser. No. 35,033, Mar. 22, 1993, Pat. No. 5,324,601.

[30] Foreign Application Priority Data

Dec. 17, 1992 [EP] European Pat. Off. .............. 92203979

[51] Int. Cl.⁶ .................... C07D 295/145; C07D 413/00
[52] U.S. Cl. .................... 544/140; 544/143; 544/149; 544/163; 546/94; 546/163; 546/207; 546/246; 546/268; 548/161; 548/179; 548/198; 548/217; 548/367.7; 548/491; 548/505; 549/426; 558/391; 558/405; 558/406; 558/409
[58] Field of Search ................................ 558/391, 409, 558/440, 446; 544/140

[56] References Cited

U.S. PATENT DOCUMENTS 5,026,677   6/1991   Vonmaele .................................. 503/227

Primary Examiner—Robert W. Ramsuer
Attorney, Agent, or Firm—Breiner & Breiner

[57] ABSTRACT

Dye-donor element for use according to thermal dye transfer comprising least one dye corresponding to the general formula (I):

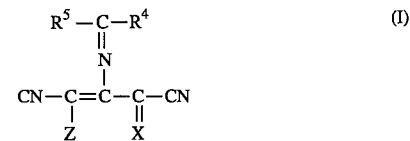

wherein Z is —CN, —COOR$^1$ or —CONR$^2$R$^3$; R$^1$ is —H, (cyclo)alkyl, or aryl; R$^2$ and R$^3$ is —H, (cyclo)alkyl, aryl, or R$^2$ and R$^3$ together represent the atoms necessary to complete a heterocyclic nucleus; R$^4$ and R$^5$ is —H, (cyclo)alkyl, aryl, a heterocyclic ring, SO$_2$R$^8$, COR$^8$, CSR$^8$, POR$^8$R$^9$, OR$^6$, NR$^6$R$^7$, SR$^6$, or R$^4$ and R$^5$ together represent the atoms necessary to complete a aliphatic ring, a heterocyclic ring including a heterocyclic ring carrying a fused-on aliphatic or aromatic ring; R$^6$ and R$^7$ is (cyclo)alkyl, aryl, alkenyl, aralkyl, aryl, a heterocyclic group, or R$^6$ and R$^7$ together represent the atoms necessary to complete a 5- or 6-membered ring; R$^8$ and R$^9$ is (cyclo)alkyl, aryl, alkenyl, aryl, a heterocyclic group, alkyloxy, aryloxy group, alkylthio, arylthio, amino, a heterocyclic group, or R$^8$ and R$^9$ together represent the atoms necessary to complete a 5- or 6-membered ring; and X represents a substituted nitrogen atom or a substituted carbon atom.

7 Claims, No Drawings

DYES FOR USE IN THERMAL DYE TRANSFER

This is a division of application Ser. No. 08/035,033 filed Mar. 22, 1993 now U.S. Pat. No. 5,324,601.

FIELD OF THE INVENTION

The present invention relates to dye-donor elements for use according to thermal dye sublimation transfer and to novel dyes for use in said dye-donor elements.

BACKGROUND OF THE INVENTION

Thermal dye sublimation transfer is a recording method in which a dye-donor element provided with a dye layer containing sublimable dyes having heat transferability is brought into contact with a receiver sheet or receiver element and selectively, in accordance with a pattern information signal, is heated by means of a thermal printing head provided with a plurality of juxtaposed heat-generating resistors, whereby dye is transferred from the selectively heated regions of the dye-donor element to the receiver sheet and forms a pattern thereon, the shape and density of which are in accordance with the pattern and intensity of heat applied to the dye-donor element.

A dye-donor element for use according to thermal dye sublimation transfer usually comprises a very thin support e.g. a polyester support, one side of which is covered with a dye layer comprising the printing dyes. Usually, an adhesive or subbing layer is provided between the support and the dye layer. Normally, the opposite side is covered with a slipping layer that provides a lubricated surface against which the thermal printing head can pass without suffering abrasion. An adhesive layer may be provided between the support and the slipping layer.

The dye layer can be a monochromic dye layer or it may comprise sequential repeating areas of differently coloured dyes e.g. dyes having a cyan, magenta, yellow, and optionally black hue. When a dye-donor element containing three or more primary colour dyes is used, a multicolour image can be obtained by sequentially performing the dye transfer process steps for each colour.

Any dye can be used in such a dye layer provided it is easily transferable to the dye-image-receiving layer of the receiver sheet or element by the action of heat.

Typical and specific examples of dyes for use in thermal dye sublimation transfer have been described in e.g. EP 209,990, EP 209,991, EP 216,483, EP 218,397, EP 227,095, EP 227,096, EP 229,374, EP 235,939, EP 247,737, EP 257,577, EP 257,580, EP 258,856, EP 279,330, EP 279,467, EP 285,665, U.S. Pat. Nos. 4,743,582, 4,753,922, 4,753,923, 4,757,046, 4,769,360, 4,771,035, 5,026,677, JP 84/78,894, JP 84/78,895, JP 84/78,896, JP 84/227,490, JP 84/227,948, JP 85/27,594, JP 85/30,391, JP 85/229,787, JP 85/229,789, JP 85/229,790, JP 85/229,791, JP 85/229,792, JP 85/229, 793, JP 85/229,795, JP 86/41,596, JP 86/268,493, JP 86/268, 494, JP 86/268,495, and JP 86/284,489.

In spite of the many dyes that already exist, there is still a continuous search for novel dyes and especially for dyes that are suited for use in dye-donor elements for thermal dye sublimation transfer printing.

SUMMARY OF THE INVENTION

It is therefore an object of the present invention to provide novel dye-donor elements for use according to thermal dye sublimation transfer printing.

It is another object of the present invention to provide novel dyes that can be used in said dye-donor elements.

Other objects will become apparent from the description hereinafter.

In accordance with the present invention a dye-donor element for use according to thermal dye sublimation transfer is provided, said dye-donor element comprising a support having thereon a dye layer comprising at least one dye, wherein said at least one dye corresponds to the following general formula (I):

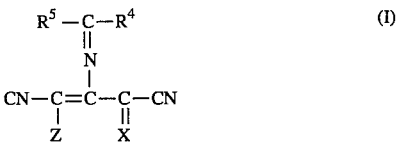

wherein

Z represents —CN, —COOR$^1$ or —CONR$^2$R$^3$;

R$^1$ represents hydrogen, an alkyl group, a substituted alkyl group, a cycloalkyl group, a substituted cycloalkyl group, an aryl group, or a substituted aryl group;

each of R$^2$ and R$^3$ (same or different) represents hydrogen, an alkyl group, a substituted alkyl group, a cycloalkyl group, a substituted cycloalkyl group, an aryl group, a substituted aryl group, or R$^2$ and R$^3$ together represent the atoms necessary to complete a heterocyclic nucleus or a substituted heterocyclic nucleus;

each of R$^4$ and R$^5$ (same or different) represents hydrogen, an alkyl group, a substituted alkyl group, a cycloalkyl group, a substituted cycloalkyl group, an aryl group, a substituted aryl group, a heterocyclic ring, a substituted heterocyclic ring, SO$_2$R$^8$, COR$^8$, CSR$^8$, POR$^8$R$^9$, OR$^6$, NR$^6$R$^7$, SR$^6$, or R$^4$ and R$^5$ together represent the atoms necessary to complete an aliphatic ring, a substituted aliphatic ring, a heterocyclic ring, a substituted heterocyclic ring including a heterocyclic ring carrying a fused-on aliphatic or aromatic ring;

each of R$^6$ and R$^7$ (same or different) represents an alkyl group, a substituted alkyl group, a cycloalkyl group, a substituted cycloalkyl group, an alkenyl group, a substituted alkenyl group, an aralkyl group, a substituted aralkyl group, an aryl group, a substituted aryl group, a heterocyclic group, or a substituted heterocyclic group, or R$^6$ and R$^7$ together represent the atoms necessary to complete a 5- or 6-membered ring;

each of R$^8$ and R$^9$ (same or different) represents an alkyl group, a substituted alkyl group, a cycloalkyl group, a substituted cycloalkyl group, an alkenyl group, a substituted alkenyl group, an aryl group, a substituted aryl group, an alkyloxy group, a substituted alkyloxy group, an aryloxy group, a substituted aryloxy group, an alkylthio group, a substituted alkylthio group, an arylthio, a substituted arylthio group, an amino group, a substituted amino group, a heterocyclic group, or a substituted heterocyclic group, or R$^8$ and R$^9$ together represent the atoms necessary to complete a 5- or 6-membered ring;

X represents a substituted nitrogen atom or a substituted carbon atom, preferentially X represents N—Ar, N—Het, CR$^{10}$R$^{11}$, N—NR$^{12}$R$^{13}$, or N—N=CR$^{14}$R$^{15}$;

Ar represents an aromatic nucleus substituted in para position by a substitutent chosen from the group consisting of an amino group, a substituted amino group, an alkyloxy group, a substituted alkyloxy group, an aryloxy group, a substituted aryloxy group, an alkylthio group, a substituted alkylthio group, an arylthio, a substituted arylthio group, hydroxy, and mercapto;

Het represents a heterocyclic ring or a substituted heterocyclic ring;

each of $R^{10}$ and $R^{11}$ (same or different) represents hydrogen, an alkyl group, a substituted alkyl group, a cycloalkyl group, a substituted cycloalkyl group, an aryl group, a substituted aryl group, an alkenyl group, a substituted alkenyl group, an alkynyl group, a substituted alkynyl group, a heterocyclic ring, a substituted heterocyclic ring, cyano, halogen, $SO_2R^6$, $COR^6$, $CSR^6$, $POR^6R^7$, or $R^{10}$ and $R^{11}$ together represent the atoms necessary to complete a substituted or unsubstituted ring including a substituted or unsubstituted heterocyclic ring;

$R^{12}$ represents an aromatic ring, a substituted aromatic ring, an aromatic heterocyclic ring, or a substituted aromatic heterocyclic ring;

$R^{13}$ represents hydrogen, an alkyl group, a substituted alkyl group, a cycloalkyl group, a substituted cycloalkyl group, an aryl group a substituted aryl group, $SO_2R^8$, $COR^8$, $CSR^8$, or $POR^8R^9$;

each of $R^{14}$ and $R^{15}$ (same or different) represents hydrogen, an alkyl group, a substituted alkyl group, a cycloalkyl group, a substituted cycloalkyl group, an aryl group, a substituted aryl group, or $R^{14}$ and $R^{15}$ together represent the atoms necessary to complete a heterocyclic ring, a substituted heterocyclic ring including a heterocyclic zing carrying a fused-on aliphatic or aromatic ring.

According to a special embodiment of the present invention, according to which X stands for N—Ar, the dyes correspond to the general formula (II):

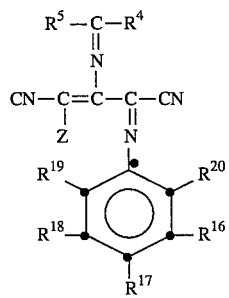

(II)

wherein $R^4$, $R^5$ and Z have a significance as defined in the above general formula I;

each of $R^{16}$, $R^{18}$, $R^{19}$, and $R^{20}$ (same or different) represents hydrogen, an alkyl group, a substituted alkyl group, a cycloalkyl group, a substituted cycloalkyl group, an aryl group, a substituted aryl group, an alkyloxy group, a substituted alkyloxy group, an aryloxy group, a substituted aryloxy group, a carbamoyl group, a substituted carbamoyl group, a sulfamoyl group, a substituted sulfamoyl group, hydroxy, halogen, NH—$SO_2R^8$, NH—$COR^8$, O—$SO_2R^8$, O—$COR^8$, $R^8$ having the significance as defined above under general formula (I), or $R^{20}$ and $R^{16}$ together and/or $R^{18}$ and $R^{19}$ together represent the atoms necessary to complete (a) ring(s) or (a) ring(s) fused-on on the benzene ring or $R^{16}$ and/or $R^{18}$ together with $R^{23}$ and/or $R^{22}$ represent the atoms necessary to complete a heterocyclic ring or a substituted heterocyclic ring fused-on on the benzene ring;

$R^{17}$ represents $OR^{21}$, $SR^{21}$, or $NR^{23}R^{22}$;

$R^{21}$ represents hydrogen, an alkyl group, a substituted alkyl group, a cycloalkyl group, a substituted cycloalkyl group, an aryl group, or a substituted aryl group, and each of $R^{23}$ and $R^{22}$ (same or different) represents hydrogen, an alkyl group, a substituted alkyl group, a cycloalkyl group, a substituted cycloalkyl group, an aryl group, a substituted aryl group, a heterocyclic group, or a substituted heterocyclic group, or $R^{23}$ and $R^{22}$ together represent the atoms necessary to complete a heterocyclic ring or a substituted heterocyclic ring, or $R^{23}$ and/or $R^{22}$ together with $R^{16}$ and/or $R^{18}$ represent the atoms necessary to complete a heterocyclic ring or a substituted heterocyclic ring fused-on on the benzene ring.

Representatives of novel dyes corresponding to general formula (II) are listed in Table 1 hereinafter.

TABLE 1

| Z | R¹⁶ | R¹⁷ | R¹⁸ | R¹⁹ | R²⁰ | R⁴ | R⁵ | N° |
|---|---|---|---|---|---|---|---|---|
| —CN | —H | —N(C₂H₅)₂ | —H | —H | —NHCOCH₃ | —H | —N(CH₃)₂ | II.1 |
| —CN | —H | —N(C₂H₅)₂ | —H | —H | —H | —H | —N(CH₃)₂ | II.2 |
| —CN | —H | —N(C₂H₅)₂ | —H | —H | —NHCOCH₃ | —H | —OCH₃ | II.3 |
| —CN | —H | —N(C₂H₅)₂ | —H | —H | —NHCOCH₃ | —CH₃ | —CH₃ | II.4 |
| —CN | —H | —N(C₂H₅)₂ | —H | —H | —NHCOCH₃ | —CH₃ | —OCH₃ | II.5 |
| —CN | —H | —N(C₂H₅)₂ | —H | —H | —NHCOCH₃ | —H | 2-(methylthio)-N-methylanilino | II.6 |
| —CN | —H | —N(C₂H₅)₂ | —H | —H | —NHCOCH₃ | —H | piperidino | II.7 |
| —CN | —H | —N(C₂H₅)₂ | —H | —H | —NHCOCH₃ | —H | morpholino | II.8 |
| —CN | —H | —N(C₂H₅)₂ | —H | —H | —H | —H | piperidino | II.9 |
| —CN | —H | —N(C₂H₅)₂ | —H | —H | —H | —C₂H₅ | —CH=C(S—)—N(C₂H₅)- (3,4-dimethylphenyl) | II.10 |
| —CN | —H | —N(C₂H₅)₂ | —H | —H | —H | —H | 2-(methylthio)-N-methylanilino | II.11 |

TABLE 1-continued

| Z | $R^{16}$ | $R^{17}$ | $R^{18}$ | $R^{19}$ | $R^{20}$ | $R^4$ | $R^5$ | N° |
|---|---|---|---|---|---|---|---|---|
| —CN | —H | —N(C$_2$H$_5$)$_2$ | —H | —H | —H | —H | morpholino (N-linked) | II.12 |
| —CN | —H | —N(C$_2$H$_5$)$_2$ | —H | —H | —H | —H | —OCH$_3$ | II.13 |
| —CN | —H | —N(C$_2$H$_5$)$_2$ | —H | —H | —H | —CH$_2$—C$_6$H$_5$ | —N(CH$_3$)$_2$ | II.14 |
| —CN | —H | —N(C$_4$H$_9$)$_2$ | —H | —H | —H | —H | piperidino (N-linked) | II.15 |
| —CN | —H | —N(C$_4$H$_9$)$_2$ | —H | —H | —H | —H | 2-(methylthio)-N-methylanilino | II.16 |
| —CN | —H | —N(C$_4$H$_9$)$_2$ | —H | —H | —H | —H | morpholino (N-linked) | II.17 |
| —CN | —H | —N(C$_4$H$_9$)$_2$ | —H | —H | —H | —H | —N(CH$_3$)$_2$ | II.18 |
| —CN | —H | —N(C$_4$H$_9$)$_2$ | —H | —H | —H | —H | —OCH$_3$ | II.19 |
| —CN | —H | —N(C$_2$H$_5$)$_2$ | —H | —H | —H | —H | 2-[N-ethyl-N-(1-methyl-1-propenyl-CH=CH—)-amino]phenoxy | II.20 |
| —CN | —H | —N(C$_2$H$_5$)$_2$ | —H | —H | —H | —H | 2-[N-ethyl-N-(vinyl)amino]phenoxy | II.21 |

TABLE 1-continued
| N° | Z | R16 | R17 | R18 | R19 | R20 | R4 | R5 |
|---|---|---|---|---|---|---|---|---|
| II.22 | —CN | —H | —N(C2H5) — C6H4 — O(CH2)2—OCH3 | —H | —H | —H | |  |
| II.23 | —CN | —H | —N(C2H5) — C6H4 — O(CH2)2—OCH3 | —H | —H | —H | —H | —N(CH3)2 |
| II.24 | —CN | —H | —N(C2H5) — C6H4 — O(CH2)2—OCH3 | —H | —H | —H | —H | 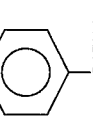 |
| II.25 | —CN | —H | —N(C2H5)2 | —H | —H | —NHCOCH3 | | 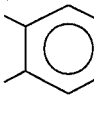 |
| II.26 | —CN | —H | —N(C2H5)2 | —H | —H | —H | |  |
| II.27 | —CN | —H | —N(C2H5)2 | —H | —H | —H | | 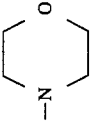 |

TABLE 1-continued

| Z | $R^{16}$ | $R^{17}$ | $R^{18}$ | $R^{19}$ | $R^{20}$ | $R^4$ | $R^5$ | N° |
|---|---|---|---|---|---|---|---|---|
| —CN | —H | —N(C$_2$H$_5$)$_2$ | —H | —H | —H | —H | H$_3$C—N(C$_6$H$_5$)—N=CH—CH— | II.28 |
| —CN | —H | —N(C$_2$H$_5$)$_2$ | —H | —H | —H | | 2-(N-methyl-N-(2-ethoxycarbonylvinyl)amino)phenyl | II.29 |
| —CN | —H | —N(C$_2$H$_5$)$_2$ | —H | —H | —H | | 2-(N-methyl-N-(2-phenylvinyl)amino)phenyl | II.30 |
| —CN | —H | —N(C$_2$H$_5$)$_2$ | —H | —H | —H | | 2-(1-phenyl-2-(N-methylamino)vinyl)phenyl | II.31 |
| —CN | —H | —N(C$_2$H$_5$)$_2$ | —H | —H | —NHCOCH$_3$ | | 2-(1-phenyl-2-(N-methylamino)vinyl)phenyl | II.32 |
| —CN | —H | —N(C$_2$H$_5$)$_2$ | —H | —H | —NHCOCH$_3$ | | 2-(N-methyl-N-(2-phenylvinyl)amino)phenyl | II.33 |
| —CN | —H | —N(C$_2$H$_5$)$_2$ | —H | —H | —OCH$_3$ | —H | —N(CH$_3$)$_2$ | II.34 |
| —COOCH$_3$ | —H | —N(C$_2$H$_5$)$_2$ | —H | —H | —NHCOCH$_3$ | —H | N-piperidinyl | II.35 |

TABLE 1-continued
| Z | $R^{16}$ | $R^{17}$ | $R^{18}$ | $R^{19}$ | $R^{20}$ | $R^4$ | $R^5$ | N° |
|---|---|---|---|---|---|---|---|---|
| —CN | —H | —N(C$_2$H$_5$)$_2$ | —H | —H | —H | —N(CH$_3$)$_2$ | —N(CH$_3$)$_2$ | II.36 |
| —CN | —H | —N(C$_2$H$_5$)$_2$ | —H | —H | —H |  |  | II.37 | and dye II.38 corresponding to the general formula II:

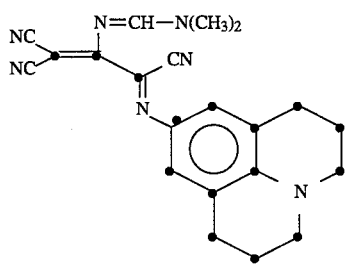

II.38

The dyes according to the present invention wherein X represents $CR^{10}R^{11}$ can be represented by the following general formula (III):

$$\begin{array}{c} R^5-C-R^4 \\ \parallel \\ N \\ | \\ CN-C=C-C-CN \\ | \quad \parallel \\ Z \quad C-R^{11} \\ | \\ R^{10} \end{array}$$

(III)

wherein Z, Y, $R^{11}$, and $R^{10}$ have a significance as defined hereinbefore In a particular type of dye according to formula (III) $R^{11}$ and $R^{10}$ together with the carbon atom to which they are attached represent the necessary atoms to close a pyrone-type nucleus represented by the structural formula:

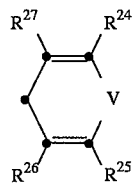

wherein

V represents —O—, —S—, —Se—, —Te—, or —N($R^{28}$)—, preferably —O— or —N($R^{28}$)—;

each of $R^{24}$, $R^{25}$, $R^{26}$, and $R^{27}$ (same or different) represents hydrogen, an alkyl group, a substituted alkyl group, a cycloalkyl group, a substituted cycloalkyl group, an aryl group, a substituted aryl group, an alkyloxycarbonyl group, an aryloxycarbonyl group, a carbamoyl group, a substituted carbamoyl group, or $R^{27}$ and $R^{24}$ together and/or $R^{25}$ and $R^{26}$ together represent the atoms needed to complete a ring or ring system or a substituted ring or ring system fused-on on the pyrone-type nucleus, and $R^{28}$ represents hydrogen, amino, an alkyl group, a substituted alkyl group, an alkyloxy group, a substituted alkyloxy group, a cycloalkyl group, a substituted cycloalkyl group, an aryl group, or a substituted aryl group.

Representatives of dyes according to formula (III) are listed below in Table 2. The dyes according to formula (III) including those wherein $R^{11}$ and $R^{10}$ together with the carbon atom to which they are attached represent the atoms needed to complete a pyrone-type nucleus are novel.

TABLE 2

| Z | $R^{10}$ | $R^{11}$ | $R^4$ | $R^5$ | No. |
|---|---|---|---|---|---|
| —CN | | 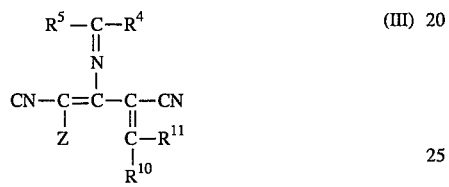 | —H | —N⟨O⟩ (morpholino) | III.1 |
| —CN | | (same as above) | —H | —N⟨ ⟩ (piperidino) | III.2 |
| —CN | | (same as above) | —H | —N(CH₃)₂ | III.3 |

TABLE 2-continued

| Z | R¹⁰ | R¹¹ | R⁴ | R⁵ | No. |
|---|---|---|---|---|---|
| —CN | | ![structure: bis(1-methylprop-1-enyl) ether, CH₃-C(=CH-O-CH=)-CH₃ with CH₃ groups] | | ![2-(methylthio)-N,N-dimethylaniline: phenyl with SCH₃ and N(CH₃)₂] | III.4 |
| —CN | | ![same bis(1-methylprop-1-enyl) ether structure] | | ![N-ethyl-1,4-dihydropyridine: N—C₂H₅] | III.5 |
| —CN | | ![1,3-diphenyl analog: C₆H₅-C(=CH-O-CH=)-C₆H₅] | —H | —N(CH₃)₂ | III.6 |
| —CN | —H | ![3,3-dimethyl-1-methyl-2-methylidene-indoline =CH—] | —H | —N(CH₃)₂ | III.7 |
| —CN | —H | " | —H | ![morpholino: —N⌒O] | III.8 |
| —CN | —H | " | —H | ![piperidino: —N⌒] | III.9 |
| —CN | —H | ![same indoline =CH—] | | ![2-(methylthio)-N,N-dimethylaniline] | III.10 |
| —CN | —CN | " | —H | —N(CH₃)₂ | III.11 |
| —CN | —COC₆H₄N(C₂H₅)₂ | —C₆H₅ | —H | —N(CH₃)₂ | III.12 |
| —CN | —COC₆H₄N(CH₃)₂ | —C₆H₄N(CH₃)₂ | —H | ![morpholino: —N⌒O] | III.13 |
| —CN | —H | —C₆H₄N(C₂H₅)₂ | —H | —N(CH₃)₂ | III.14 |
| —CN | —H | —C₆H₄N(C₄H₉)CH(CH₃)C₂H₅ | —H | —N(CH₃)₂ | III.15 |
| —CN | —H | ![5-chloro-thiazol-2-yl with N=CHN(CH₃)₂ substituent] | —H | —N(CH₃)₂ | III.16 |

TABLE 2-continued

| Z | $R^{10}$ | $R^{11}$ | $R^4$ | $R^5$ | No. |
|---|---|---|---|---|---|
| —CN | —H | 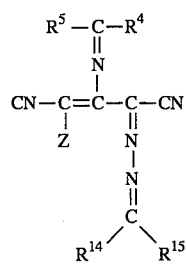 | —H | —N(CH$_3$)$_2$ | III.17 |
| —CN | | 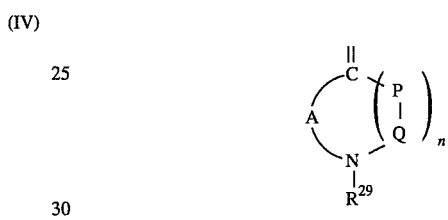 | —H | —N(CH$_3$)$_2$ | III.18 |

The dyes according to the present invention wherein X represents N—N=CR$^{15}$R$^{14}$ can be represented by the following general formula (IV):

$$R^5—\underset{\underset{\underset{\underset{R^{14}}{\diagup}\underset{C}{\overset{\|}{N}}\diagdown R^{15}}{N}}{\underset{\|}{N}}}{\underset{\|}{C}}—R^4$$

$$CN—\underset{Z}{\overset{|}{C}}=\underset{}{C}—\underset{}{C}—CN$$

wherein R$^4$, R$^5$, Z, R$^{14}$, and R$^{15}$ have a significance as defined hereinbefore.

In a particular type of dye according to general formula (IV) R$^{14}$ and R$^{15}$ together with the carbon atom to which they are attached represent the atoms needed to complete a heterocyclic nucleus represented by the following general formula:

$$\left(\underset{A}{\overset{\overset{\|}{C}}{\diagup}}\underset{\underset{R^{29}}{N}}{\diagdown}\underset{Q}{\overset{P}{\diagdown}}\right)_n$$

wherein
n represents 0, 1, or 2;
P and Q (same or different) represent a methine group or a substituted methine group;
R$^{29}$ represents an alkyl group, a substituted alkyl group, a cycloalkyl group, a substituted cycloalkyl group, an aryl group, or a substituted aryl group, and
A represents a bond or the atoms needed to complete a nitrogen-containing heterocyclic nucleus including said nucleus in substituted form.

Representatives of dyes according to general formula (IV) are listed below in Table 3. The dyes according to general formula (IV) are novel.

TABLE 3

| Z | $R^{14}$ | $R^{15}$ | $R^4$ | $R^5$ | No. |
|---|---|---|---|---|---|
| —CN | | ![IV.1 structure with CH$_3$, N-C$_6$H$_5$] | —H | —N(CH$_3$)$_2$ | IV.1 |
| —CN | | " | | ![S, N-CH$_3$ structure] | IV.2 |
| —CN | | " | —H | ![morpholine -N O] | IV.3 |

TABLE 3-continued

| Z | R$^{14}$ | R$^{15}$ | R$^4$ | R$^5$ | No. |
|---|---|---|---|---|---|
| —CN | | (N-methyl-2-phenyl indole) with CH$_3$ on N and C$_6$H$_5$ | —H | —N(CH$_3$)$_2$ | IV.4 |
| —CN | | " | | (benzothiazoline N-CH$_3$) | IV.5 |
| —CN | | " | —H | (morpholino) —N<span>O</span> | IV.6 |

The dyes according to the present invention wherein X represents N—Het, Het standing for a heterocyclic nucleus, correspond to the general formula (V):

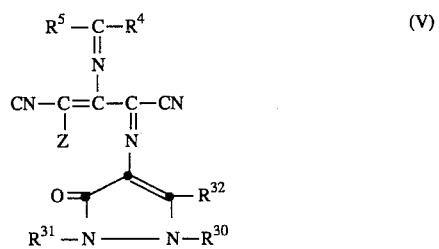

(V)

wherein

R$^4$, R$^5$, and Z have a significance as defined hereinbefore;

R$^{30}$ represents hydrogen, an alkyl group, a substituted alkyl group, a cycloalkyl group, a substituted cycloalkyl group, an aryl group, a substituted aryl group, a heterocyclic nucleus, or a substituted heterocyclic nucleus, R$^{31}$ represents hydrogen, an alkyl group, a substituted alkyl group, a cycloalkyl group, a substituted cycloalkyl group, an aryl group, a substituted aryl group, an acyl group, a substituted acyl group, a heterocyclic nucleus, or a substituted heterocyclic nucleus, and R$^{32}$ represents hydrogen or any substituent e.g. an alkyl group, a substituted alkyl group, a cycloalkyl group, a substituted cycloalkyl group, an aryl group, a substituted aryl group, a carboxylic ester group, a carbamoyl group, a substituted carbamoyl group, amino, substituted amino, acylamino, and substituted acylamino.

Representatives of dyes according to formula (V) are listed below in Table 4. The dyes according to formula (V) are novel.

TABLE 4

| Z | R$^{30}$ | R$^{31}$ | R$^{32}$ | R$^4$ | R$^5$ | No. |
|---|---|---|---|---|---|---|
| —CN | —CH$_3$ | —C$_6$H$_5$ | —CH$_3$ | —H | —N(CH$_3$)$_2$ | V.1 |
| —CN | —CH$_3$ | —C$_6$H$_5$ | —CH$_3$ | | (benzothiazoline N—CH$_3$) | V.2 |
| —CN | —CH$_3$ | —C$_6$H$_5$ | —CH$_3$ | —H | (morpholino) —N<span>O</span> | V.3 |
| —CN | —CH$_3$ | —CH$_3$ | —C$_{13}$H$_{25}$ | —H | —N(CH$_3$)$_2$ | V.4 |
| —CN | —CH$_3$ | —CH$_3$ | —C$_{13}$H$_{25}$ | —H | (morpholino) —N<span>O</span> | V.5 |

TABLE 4-continued

| Z | $R^{30}$ | $R^{31}$ | $R^{32}$ | $R^4$ | $R^5$ | No. |
|---|---|---|---|---|---|---|
| —CN | —CH$_3$ | —CH$_3$ | —C$_{13}$H$_{25}$ | 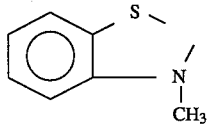 | | V.6 |

The present invention also provides novel dyes corresponding to any of the above general formulae I to V.

The present invention further provides a dyed receiving element comprising a dye in image-wise distribution, formed by thermal dye sublimation transfer using a dye-donor element according to the present invention.

The present invention also provides a method of forming an image by image-wise heating a dye-donor element comprising a support having thereon a dye layer comprising a binder and at least one dye corresponding to any of the above general formulae I to V, and causing transfer of the image-wise heated dye to a receiver sheet.

The dyes corresponding to the general formulae (I), (II), (III), (IV), and (V) can be prepared by derivatisation of dyes corresponding to the following general formula (VI):

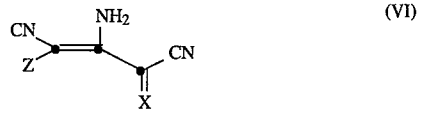

the significance of Z and X being as defined in the above general formula (I) and the synthesis of which has been described in U.S. Pat. No. 5,026,677. This will become apparent from the preparation examples hereinafter.

PREPARATION EXAMPLE 1

Synthesis of Dye II.4

Dye II.4 is prepared according to reaction scheme 1. Dye A is prepared as described in U.S. Pat. No. 5,026,677.

Reaction scheme 1

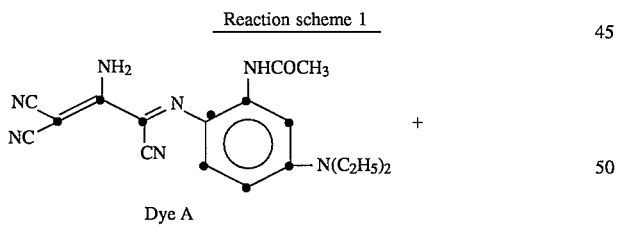

5.0 g of dye A and 2.4 ml of N,N-dimethylformamide dimethyl acetal are dissolved in 100 ml of ethyl acetate. The reaction mixture is stirred at room temperature for 45 min and poured out in 100 ml of methanol. The precipitate is collected and purified by column chromatography with dichloromethane/ethyl acetate 90/10 as eluent. The resulting product is recrystallized from ethanol.

Yield: 2.2 g of dye II.4 melting at 174° C.

PREPARATION EXAMPLE 2

Synthesis of dye II.6

Dye II.6 is prepared according to reaction scheme 2.

Reaction scheme 2

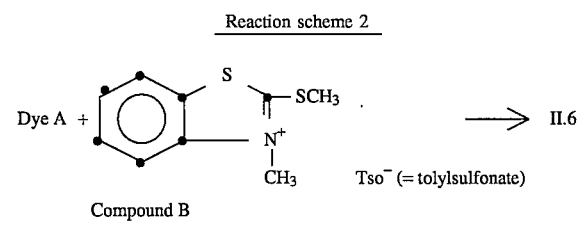

5.0 g of dye A and 6.3 g of compound B are dissolved in 100 ml of ethyl acetate and 2.0 ml of triethylamine is added. The reaction mixture is refluxed for 90 min. After cooling the crystals are collected and recrystallized from acetonitrile.

Yield: 2.6 g of dye II.6 melting at 205° C.

PREPARATION EXAMPLE 3

Synthesis of dye II.9

Dye II.9 is prepared according to reaction scheme 3. Dye C is prepared according to U.S. Pat. No. 5,026,677.

Reaction scheme 3

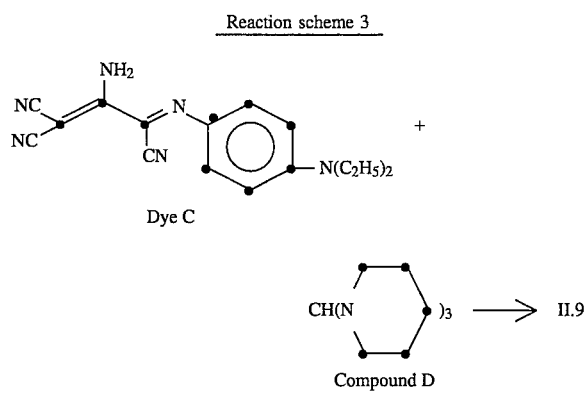

2.0 g of dye C and 2.4 g of compound D are dissolved in 20 ml of tetrahydrofuran and the solution is stirred for 5 minutes at 20° C. Dichloromethane is added and the solution is extracted by means of 1N hydrochloric acid, a saturated sodium hydrogen carbonate solution and brine (saturated sodium chloride solution). The solution is dried over sodium sulfate and concentrated under reduced pressure. The residue is crystallized from ethanol.

Yield: 1.8 g of dye II.9 melting at 140° C.

PREPARATION EXAMPLE 4

Synthesis of dye II.30

Dye 11.30 is prepared according to reaction scheme 4.

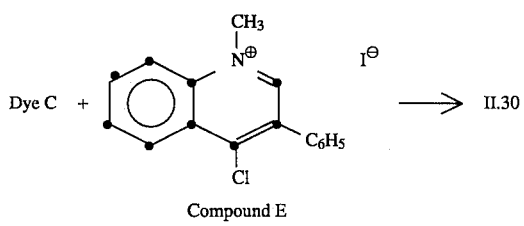

Reaction scheme 4

4.3 ml of triethylamine is added to a suspension of 3.0 g of dye C and 4.7 g of compound E in 50 ml of ethyl acetate. The suspension is refluxed for 4 h and poured out in 100 ml of ethanol. The precipitate is filtered and recrystallized from 120 ml of acetonitrile.

Yield: 3.5 g of dye II.30.

PREPARATION EXAMPLE 5

Synthesis of dye II.31

Dye II.31 is prepared according to reaction scheme.

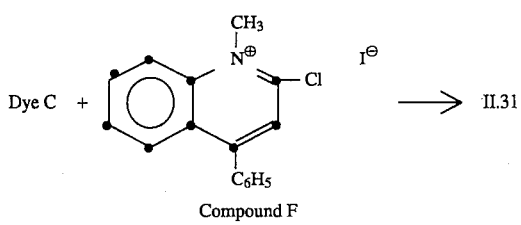

Reaction scheme 5

A suspension of 3.0 g of dye C and 5.1 g of compound F in 50 ml of ethyl acetate and 2.9 ml of triethylamine is refluxed for 2.5 h. Ethyl acetate is added and the solution is washed with brine. After having been dried ever sodium sulfate and concentrated by evaporation the residue is recrystallized from ethanol.

Yield: 4.1 g of dye II.31 (sticky) melting at 140° C.

PREPARATION EXAMPLE 6

Synthesis of dye III.3

Dye III.3 is prepared according to reaction scheme 6. Dye G is prepared according to U.S. Pat. No. 5,026,677.

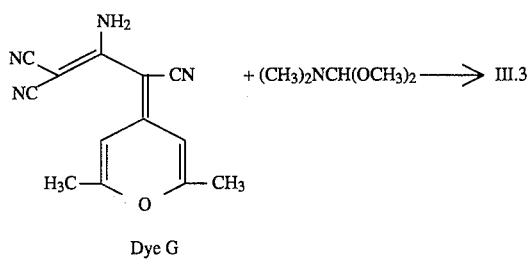

Reaction scheme 6

A suspension of 10 g of dye G and 6.5 ml of N,N-dimethylformamide dimethyl acetal in 100 ml of ethyl acetate is refluxed for 5 min. The cooled suspension is filtered and the filtrate is purified by recrystallization from acetonitrile.

Yield: 8.6 g of dye III.3 melting at 211° C.

PREPARATION EXAMPLE 7

Synthesis of dye IV.1

Dye IV.1 is prepared according to reaction scheme 7. Dye H is prepared according to U.S. Pat. No. 5,026,677.

Reaction scheme 7

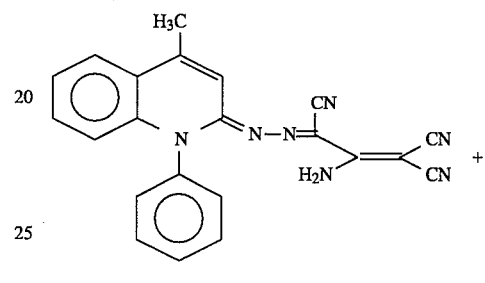

Dye H

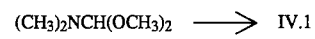

$(CH_3)_2NCH(OCH_3)_2 \longrightarrow$ IV.1

2.6 g of dye H and 1.1 ml of N,N-dimethylformamide dimethyl acetal are dissolved in 100 ml of tetrahydrofuran and refluxed for 30 min. After cooling methanol is added and the precipitate is filtered.

Yield: 2.2 g of dye IV.1 (73%).

PREPARATION EXAMPLE 8

Synthesis Of dye IV.6

Dye IV.6 is prepared according to reaction scheme 8. Dye J is prepared according to U.S. Pat. No. 5,026,677.

Reaction scheme 8

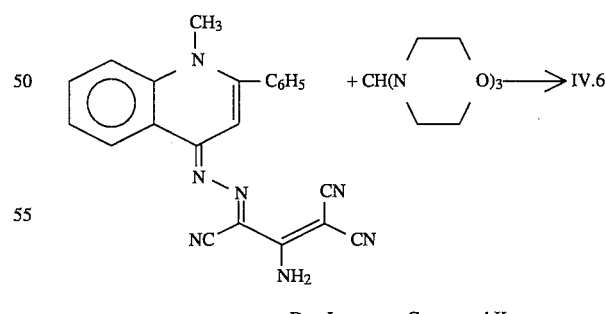

Dye J          Compound K 1.7 g of compound K is dissolved in 50 ml of acetonitrile whilst heating. 2.0 g of dye J is added and the solution is refluxed for 1 h. After cooling the precipitate is filtered and washed with methanol.

Yield: 2.4 g (96%) of dye IV.6.

PREPARATION EXAMPLE 9

Synthesis of dye V.2

Dye V.2 is prepared according to reaction scheme 9. Dye L is prepared according to U.S. Pat. No. 5,026,677.

Reaction scheme 9

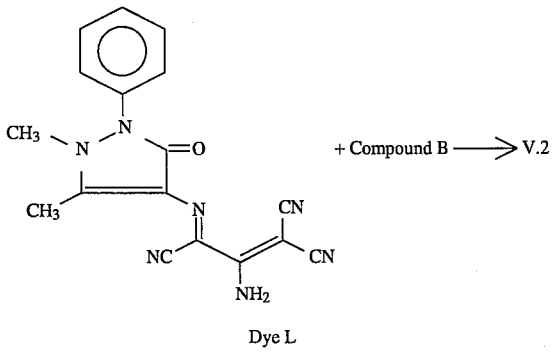

Dye L 4.0 g of dye L and 5.3 g of compound B are dissolved in 50 ml of tetrahydrofuran. 4.2 ml of triethylamine is added and the solution is refluxed for 10 min. After cooling the solution is extracted with ethyl acetate and washed with a brine. The dried solution is concentrated under reduced pressure and the residue is purified by column chromatography with dichloromethane/ethyl acetate 90/10 as eluent.

Yield: 1.3 g of pure dye V.2.

The dyes of the present invention have a cyan, magenta, or yellow hue and have a good solubility in ecologically acceptable organic solvents such as e.g. ethyl acetate and ethyl methyl ketone.

The dyes can be used as filter dyes e.g. for silver halide colour photographic materials and also as antihalation dyes. They can be used in inkjet printing, resistive ribbon printing, in inks e.g. for laser applications, in textile, in lacquers, and in paints. They can also be used for transfer printing on fabrics.

According to a preferred embodiment of the present invention the dyes are used in the dye layer of a dye-donor element for thermal dye sublimation transfer.

To improve the stability of the dyes to light, the use of a metal complex of the dye e.g. a Ni or Co complex is also effective.

The dye layer is formed preferably by adding the dyes, the polymeric binder medium, and other optional components to a suitable solvent or solvent mixture, dissolving or dispersing the ingredients to form a coating composition that is applied to a support, which may have been provided first with an adhesive or subbing layer, and dried.

The dye layer thus formed has a thickness of about 0.2 to 5.0 μm, preferably 0.4 to 2.0 μm, and the amount ratio of dye to binder ranges from 9:1 to 1:3 by weight, preferably from 2:1 to 1:2 by weight.

As polymeric binder the following can be used: cellulose derivatives, such as ethyl cellulose, hydroxyethyl cellulose, ethylhydroxy cellulose, ethylhydroxyethyl cellulose, hydroxypropyl cellulose, methyl cellulose, cellulose nitrate, cellulose acetate formate, cellulose acetate hydrogen phthalate, cellulose acetate, cellulose acetate propionate, cellulose acetate butyrate, cellulose acetate pentanoate, cellulose acetate benzoate, cellulose triacetate; vinyl-type resins and derivatives, such as polyvinyl alcohol, polyvinyl acetate, polyvinyl butyral, copolyvinyl butyral-vinyl acetal-vinyl alcohol, polyvinyl pyrrolidone, polyvinyl acetoacetal, polyacrylamide; polymers and copolymers derived from acrylates and acrylate derivatives, such as polyacrylic acid, polymethyl methacrylate and styrene-acrylate copolymers; polyester resins; polycarbonates; copolystyrene-acrylonitrile; polysulfones; polyphenylene oxide; organosilicones, such as polysiloxanes; epoxy resins and natural resins, such as gum arabic. Preferably, the binder for the dye layer of the present invention comprises cellulose acetate butyrate or copolystyrene-acrylonitrile.

The coating layer may also contain other additives, such as curing agents, preservatives, organic or inorganic fine particles, dispersing agents, antistatic agents, defoaming agents, viscosity-controlling agents, these and other ingredients having been described more fully in EP 133,011, EP 133,012, EP 111,004, and EP 279,467.

Any material can be used as the support for the dye-donor element provided it is dimensionally stable and capable of withstanding the temperatures involved, up to 400° C. over a period of up to 20 msec, and is yet thin enough to transmit heat applied on one side through to the dye on the other side to effect transfer to the receiver sheet within such short periods, typically from 1 to 10 msec. Such materials include polyesters such as polyethylene terephthalate, polyamides, polyacrylates, polycarbonates, cellulose esters, fluorinated polymers, polyethers, polyacetals, polyolefins, polyimides, glassine paper and condenser paper. Preference is given to a support comprising polyethylene terephthalate. In general, the support has a thickness of 2 to 30 μm. The support may also be coated with an adhesive or subbing layer, if desired.

The dye layer of the dye-donor element may be coated on the support or printed thereon by a printing technique such as a gravure process.

A dye barrier layer comprising a hydrophilic polymer may also be employed between the support and the dye layer of the dye-donor element to enhance the dye transfer densities by preventing wrong-way transfer of dye backwards to the support. The dye barrier layer may contain any hydrophilic material that is useful for the intended purpose. In general, good results have been obtained with gelatin, polyacrylamide, polyisopropyl acrylamide, butyl methacrylate-grafted gelatin, ethyl methacrylate-grafted gelatin, ethyl acrylate-grafted gelatin, cellulose monoacetate, methylcellulose, polyvinyl alcohol, polyethyleneimine, polyacrylic acid, a mixture of polyvinyl alcohol and polyvinyl acetate, a mixture of polyvinyl alcohol and polyacrylic acid, or a mixture of cellulose monoacetate and polyacrylic acid. Suitable dye barrier layers have been described in e.g. EP 227,091 and EP 228,065. Certain hydrophilic polymers e.g. those described in EP 227,091 also have an adequate adhesion to the support and the dye layer, so that the need for a separate adhesive or subbing layer is avoided. These particular hydrophilic polymers used in a single layer in the dye-donor element thus perform a dual function, hence are referred to as dye barrier/subbing layers.

Preferably the reverse side of the dye-donor element has been coated with a slipping layer to prevent the printing head from sticking to the dye-donor element. Such a slipping layer would comprise a lubricating material such as a surface-active agent, a liquid lubricant, a solid lubricant or mixtures thereof, with or without a polymeric binder. The surface-active agents may be any agents known in the art such as carboxylates, sulfonates, phosphates, aliphatic amine salts, aliphatic quaternary ammonium salts, polyoxyethylene alkyl ethers, polyethylene glycol fatty acid esters, fluoroalkyl $C_2$–$C_{20}$ aliphatic acids. Examples of liquid lubricants include silicone oils, synthetic oils, saturated hydrocarbons, and glycols. Examples of solid lubricants include various higher alcohols such as stearyl alcohol, fatty acids and fatty acid exters. Suitable slipping layer have been described in e.g. EP 138,483, EP 227,090, U.S. Pat. Nos. 4,567,113, 4,572,860, 4,717,711. Preferably the slipping layer comprises a styrene-acrylonitrile copolymer or a styrene-acrylonitrile-butadiene copolymer or a mixture thereof or a polycarbonate as described in European patent application no. 91202071.6 and in the corresponding U.S. Ser. No. 07/921,087 filed Jul. 29, 1992, now U.S. Pat. No. 5,234,888, as binder and a polysiloxane-polyether copolymer or polytetrafluoroethylene or a mixture thereof as lubricant in an amount of 0.1 to 10% by weight of the binder or binder mixture.

The support for the receiver sheet that is used with the dye-donor element may be a transparent film of e.g. polyethylene terephthalate, a polyether sulfone, a polyimide, a cellulose ester or a polyvinyl alcohol-co-acetal. The support may also be a reflective one such as a baryta-coated paper, polyethylene-coated paper or white polyester i.e. white-pigmented polyester. Blue-coloured polyethylene terephthalate film can also be used as support.

To avoid poor adsorption of the transferred dye to the support of the receiver sheet or receiver element this support must be coated with a special layer called dye-image-receiving layer, into which the dye can diffuse more readily. The dye-image-receiving layer may comprise e.g. a polycarbonate, a polyurethane, a polyester, a polyamide, polyvinyl chloride, polystyrene-co-arcylonitrile, polycaprolactone, or mixtures thereof. The dye-image receiving layer may also comprise a heat-cured product of poly(vinyl chloride/co-vinyl acetate/co-vinyl alcohol) and polyisocyanate. Suitable dye-image-receiving layers have been described in e.g. EP 133,011, EP 133,012, EP 144,247, EP 227,094, and EP 228,066.

In order to improve the light-fastness and other stabilities of recorded images UV-absorbers, singlet oxygen quenchers such as HALS-compounds (Hindered Amine Light Stabilizers) and/or antioxidants can be incorporated into the dye-image-receiving layer.

The dye layer of the dye-donor element or the dye-image-receiving layer of the receiver sheet or receiver element may also contain a releasing agent that aids in separating the dye-donor element from the receiver sheet after transfer. The releasing agents can also be incorporated in a separate layer on at least part of the dye layer and/or of the dye-image-receiving layer. Suitable releasing agents are solid waxes, fluorine- or phosphate-containing surface-active agents and silicone oils. Suitable releasing agents have been described in e.g. EP 133,012, JP 85/19,138, and EP 227,092.

The dye-donor elements according to the invention are used to form a dye transfer image, which process comprises placing the dye layer of the dye-donor element in face-to-face relation with the dye-image-receiving layer of the receiver sheet or receiver element and image-wise heating from the back of the dye-donor element. The transfer of the dye is accomplished by heating for about several milliseconds at a temperature of 400° C.

When the process is performed for but one single colour, a monochromic dye transfer image is obtained. A multicolour image can be obtained by using a dye-donor element containing three or more primary colour dyes and sequentially performing the process steps described above for each colour. The above sandwich of dye-donor element and receiver sheet is formed on three occasions during the time when heat is applied by the thermal printing head. After the first dye has been transferred, the elements are peeled apart. A second dye-donor element (or another area of the dye-donor element with a different dye area) is then brought in register with the dye-receiving element and the process is repeated. The third colour and optionally further colours are obtained in the same manner.

In addition to thermal heads, laser light, infrared flash, or heated pens can be used as the heat source for supplying heat energy. Thermal printing heads that can be used to transfer dye from the dye-donor elements of the present invention to a receiver sheet are commercially available. In case laser light is used, the dye layer or another layer of the dye element has to contain a compound that absorbs the light emitted by the laser and converts it into heat e.g. carbon black.

Alternatively, the support of the dye-donor element may be an electrically resistive ribbon Consisting of e.g. a multilayer structure of a carbon-loaded polycarbonate coated with a thin aluminium film. Current is injected into the resistive ribbon by electrically addressing a printing head electrode resulting in highly localized heating of the ribbon beneath the relevant electrode. The fact that in this case the heat is generated directly in the resistive ribbon and that it is thus the ribbon that gets hot leads to an inherent advantage in printing speed using the resistive ribbon/electrode head technology as compared to the thermal head technology, according to which the various elements of the thermal head get hot and must cool down before the head can move to the next printing position.

The following examples illustrate the invention in more detail without, however, limiting the scope thereof.

EXAMPLE 1

The absorption maxima ($\mu_{max}$) and molar extinction coefficients ($\epsilon$) of the dyes identified below were determined in methanol. The results are listed in table 5.

TABLE 5

| dye | $\lambda_{max}$ (nm) | $\epsilon$ (mol$^{-1}$ cm$^{-1}$ l) |
|---|---|---|
| II.1 | 571 | 50015 |
| II.2 | 540 | 40832 |
| II.3 | 600 | 55102 |
| II.5 | 540 | 34274 |
| II.6 | 593 | 54748 |
| II.7 | 570 | 49618 |
| II.8 | 577 | 53173 |
| II.9 | 539 | 29884 |
| II.11 | 561 | 46330 |
| II.12 | 546 | 41667 |
| II.15 | 543 | 42852 |
| II.16 | 565 | 39234 |
| II.17 | 550 | 44104 |
| II.18 | 540 | 39177 |
| II.22 | 550 | 34529 |
| II.23 | 533 | 32071 |
| II.24 | 538 | 29959 |
| II.25 | 548 | 46698 |
| II.32 | 560 | 19892 |
| II.33 | 525 | 24040 |
| III.1 | 349 | 31034 |
| III.2 | 351 | 32275 |
| III.3 | 346 | 31702 |
| III.4 | 400 | 47529 |
| III.7 | 497 | 68678 |
| IV.1 | 407 | 20103 |
|  | 480 | 17987 |
| IV.2 | 411 | 26719 |
| IV.3 | 488 | 24390 |
| V.1 | 414 | 14816 |
| V.2 | 419 | 22154 |

EXAMPLE 2

Receiver sheets were prepared by coating a polyethylene-coated paper support weighing 180 g with a dye-image-receiving layer from a solution in ethyl methyl ketone of 3,6 g/m² of poly(vinyl chloride/co-vinyl acetate/co-vinyl alcohol) (Vinylite VAGD supplied by Union Carbide), 0,336 g/m² of diisocyanate (Desmodur N3300 supplied by Bayer AG), and 0,2 g/m² of hydroxy-modified polydimethylsiloxane (Tegomer H SI 2111 supplied by Goldschmidt).

Dye-donor elements for use according to thermal dye sublimation transfer were prepared as follows:

A solution comprising 0.5% by weight of dye and 0.5% by weight of copoly(styrene-acrylonitrile) (Luran 388S, supplied by BASF, Germany) as binder in ethyl methyl ketone was prepared.

From this solution a dye layer having a wet thickness of 100 um was coated on a polyethylene terephthalate film support having a thickness of 6 μm and carrying a conventional subbing layer. The resulting dye layer was dried by evaporation of the solvent.

The opposite side of the film support was coated with a subbing layer of a copolyester comprising ethylene glycol, adipic acid, neopentyl glycol, terephthalic acid, isophthalic acid, and glycerol.

The resulting subbing layer was covered with a solution in methyl ethyl ketone of 0.5 g/m² of a polycarbonate having the following structural formula to form a heat-resistant layer:

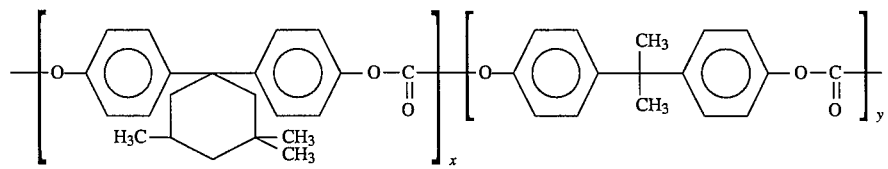

wherein x=55 mol % and y=45 mol %.

Finally, a top layer of polyether-modified polydimethylsiloxane (Tegoglide 410, Goldschmidt) was coated from a solution in isopropanol on the resulting heat-resistant polycarbonate layer.

The dye-donor element was printed in combination with a receiver sheet in a Mitsubishi colour video printer CP100E.

The receiver sheet was separated from the dye-donor element and the colour density value of the recorded image was measured by means of a Macbeth TR 924 densitometer in Status A mode.

The above described experiment was repeated for each of the dyes identified in Table 6 hereinafter.

TABLE 6

| Dye | Dmax |
|---|---|
| II.1 | 1.42 |
| II.2 | 2.44 |
| II.3 | 2.18 |
| II.6 | 1.12 |
| II.7 | 1.20 |
| II.8 | 1.02 |
| II.9 | 1.95 |
| II.11 | 1.32 |

TABLE 6-continued

| Dye | Dmax |
|---|---|
| II.12 | 1.93 |
| II.15 | 2.00 |
| II.16 | 1.21 |
| II.17 | 1.69 |
| II.29 | 0.81 |
| II.31 | 1.02 |
| III.7 | 1.14 |
| V.1 | 0.76 |

We claim:

1. Dye corresponding to the general formula (I):

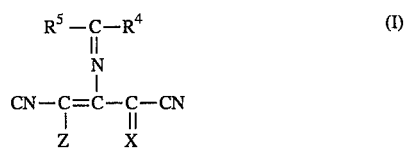

wherein:

Z represents —CN, —COOR¹ or —CONR²R³;

R¹ represents hydrogen, an alkyl group, a substituted alkyl group, a cycloalkyl group, a substituted Cycloalkyl group, an aryl group, or a substituted aryl group;

each of R² and R³ (same or different) represents hydrogen, an alkyl group, a substituted alkyl group, a cycloalkyl group, a substituted cycloalkyl group, an aryl group, a substituted aryl group, or R² and R³ together represent the atoms necessary to complete a heterocyclic nucleus or a substituted heterocyclic nucleus;

each of R⁴ and R⁵ (same or different) represents hydrogen, an alkyl group, a substituted alkyl group, a cycloalkyl group, a substituted cycloalkyl group, an aryl group, a substituted aryl group, a heterocyclic ring, a substituted heterocyclic ring, SO₂R⁸, COR⁸, CSR⁸, POR⁸R⁹, OR⁶, NR⁶R⁷, SR⁶, or R⁴ and R⁵ together represent the atoms necessary to complete an aliphatic ring, a substituted aliphatic ring, a heterocyclic ring, a substituted heterocyclic ring;

each of R⁶ and R⁷ (same or different) represents an alkyl group, a substituted alkyl group, a cycloalkyl group, a substituted cycloalkyl group, an alkenyl group, a substituted alkenyl group, an aralkyl group, a substituted aralkyl group, an aryl group, a substituted aryl group, a heterocyclic group, or a substituted heterocyclic group, or R⁶ and R⁷ together represent the atoms necessary to complete a 5- or 6-membered ring;

each of $R^8$ and $R^9$ (same or different) represents an alkyl group, a substituted alkyl group, a cycloalkyl group, a substituted cycloalkyl group, an alkenyl group, a substituted alkenyl group, an aryl group, a substituted aryl group, an alkyloxy group, a substituted alkyloxy group, an aryloxy group, a substituted aryloxy group, an alkylthio group, a substituted alkylthio group, an arylthio, a substituted arylthio group, an amino group, a substituted amino group, a heterocyclic group, or a substituted heterocyclic group, or $R^8$ and $R^9$ together represent the atoms necessary to complete a 5- or 6-membered ring; and X represents a substituted nitrogen atom or a substituted carbon atom.

2. A dye according to claim 1, wherein said dye corresponds to the general formula (II):

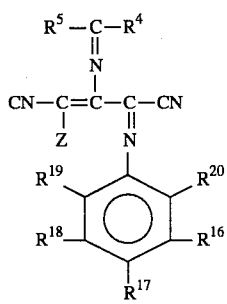

(II)

wherein each of $R^{16}$, $R^{18}$, $R^{19}$, and $R^{20}$ (same or different) represents hydrogen, an alkyl group, a substituted alkyl group, a cycloalkyl group, a substituted cycloalkyl group, an aryl group, a substituted aryl group, an alkyloxy group, a substituted alkyloxy group, an aryloxy group, a substituted aryloxy group, a carbamoyl group, a substituted carbamoyl group, a sulfamoyl group, a substituted sulfamoyl group, hydroxy, halogen NH—$SO_2R^8$, NH—$COR^8$, O—$SO_2R^8$, O—$COR^8$, or $R^{20}$ and $R^{16}$ together and/or $R^{18}$ and $R^{19}$ together represent the atoms necessary to complete (a) ring(s) or (a) ring(s) fused-on on the benzene ring or $R^{16}$ and/or $R^{18}$ together with $R^{23}$ and/or $R^{22}$ represent the atoms necessary to complete a heterocyclic ring or a substituted heterocyclic ring fused-on on the benzene ring;

$R^{17}$ represents $OR^{21}$, $SR^{21}$, or $NR^{23}R^{22}$;

$R^{21}$ represents hydrogen, an alkyl group, a substituted alkyl group, a cycloalkyl group, a substituted cycloalkyl group, an aryl group, or a substituted aryl group, and each of $R^{23}$ and $R^{22}$ (same or different) represents hydrogen, an alkyl group, a substituted alkyl group, a cycloalkyl group, a substituted cycloalkyl group, an aryl group, a substituted aryl group, a heterocyclic group, or a substituted heterocyclic group, or $R^{23}$ and $R^{22}$ together represent the atoms necessary to complete a heterocyclic ring or a substituted heterocyclic ring, or $R^{23}$ and/or $R^{22}$ together with $R^{16}$ and/or $R^{18}$ represent the atoms necessary to complete a heterocyclic ring or a substituted heterocyclic ring fused-on on the benzene ring.

3. A dye according to claim 1, wherein said dye corresponds to the general formula (III):

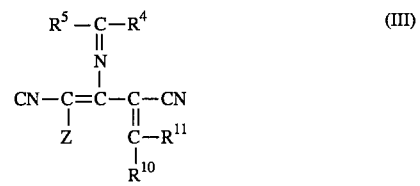

wherein each of $R^{10}$ and $R^{11}$ (same or different) represents hydrogen, an alkyl group, a substituted alkyl group, a cycloalkyl group, a substituted cycloalkyl group, an aryl group, a substituted aryl group, an alkenyl group, a substituted alkenyl group, an alkynyl group, a substituted alkynyl group, a heterocyclic ring, a substituted heterocyclic ring, cyano, halogen, $SO_2R^6$, $COR^6$, $CSR^6$, $POR^6R^7$, or $R^{10}$ and $R^{11}$ together represent the atoms necessary to complete a substituted or unsubstituted ring including a substituted or unsubstituted heterocyclic ring.

4. A dye according to claim 1, wherein $R^{10}$ and $R^{11}$ together with the carbon atom to which they are attached represent the necessary atoms to close a pyrone-type nucleus represented by the structural formula:

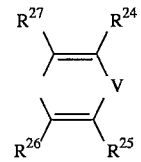

wherein

V represents —O—, —S—, —Se—, —Te—, or —N($R^{28}$)—;

each of $R^{24}$, $R^{25}$, $R^{26}$, and $R^{27}$ (same or different) represents hydrogen, an alkyl group, a substituted alkyl group, a cycloalkyl group, a substituted cycloalkyl group, an aryl group, a substituted aryl group, an alkyloxycarbonyl group, an aryloxycarbonyl group, a carbamoyl group, a substituted carbamoyl group, or $R^{27}$ and $R^{24}$ together and/or $R^{25}$ and $R^{26}$ together represent the atoms needed to complete a ring or ring system or a substituted ring or ring system fused-on on the pyrone-type nucleus; and $R^{28}$ represents hydrogen, amino, an alkyl group, a substituted alkyl group, an alkyloxy group, a substituted alkyloxy group, a cycloalkyl group, a substituted cycloalkyl group, an aryl group, or a substituted aryl group.

5. A dye according to claim 1, wherein said dye corresponds to the general formula (IV):

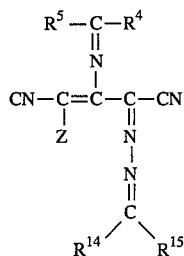 (IV)

wherein:
each of $R^{14}$ and $R^{15}$ (same or different) represents hydrogen, an alkyl group, a substituted alkyl group, a cycloalkyl group, a substituted cycloalkyl group, an aryl group, a substituted aryl group, or $R^{14}$ and $R^{15}$ together represent the atoms necessary to complete a heterocyclic ring, a substituted heterocyclic ring including a heterocyclic ring carrying a fused-on aliphatic or aromatic ring.

6. A dye according to claim 5, wherein $R^{14}$ and $R^{15}$ together with the carbon atom to which they are attached represent the atoms needed to complete a heterocyclic nucleus represented by the following general formula:

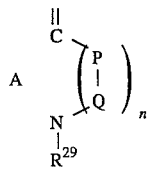

wherein
n represents 0, 1, or 2;
P and Q (same or different) represent a methine group or a substituted methine group;

$R^{29}$ represents an alkyl group, a substituted alkyl group, a cycloalkyl group, a substituted cycloalkyl group, an aryl group, or a substituted aryl group, and A represents a bond or the atoms needed to complete a nitrogen-containing heterocyclic nucleus including said nucleus in substituted form.

7. A dye according to claim 1, wherein said dye corresponds to the general formula (V):

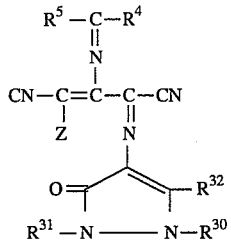 (V)

wherein
$R^{30}$ represents hydrogen, an alkyl group, a substituted alkyl group, a cycloalkyl group, a substituted cycloalkyl group, an aryl group, a substituted aryl group, a heterocyclic nucleus, or a substituted heterocyclic nucleus, $R^{31}$ represents hydrogen, an alkyl group, a substituted alkyl group, a cycloalkyl group, a substituted cycloalkyl group, an aryl group, a substituted aryl group, an acyl group, a substituted acyl group, a heterocyclic nucleus, or a substituted heterocyclic nucleus, and $R^{32}$ represents hydrogen or any substituent e.g. an alkyl group, a substituted alkyl group, a cycloalkyl group, a substituted cycloalkyl group, an aryl group, a substituted aryl group, a carboxylic ester group, a carbamoyl group, a substituted carbamoyl group, amino, substituted amino, acylamino, and substituted acylamino.

* * * * *